UNITED STATES PATENT OFFICE.

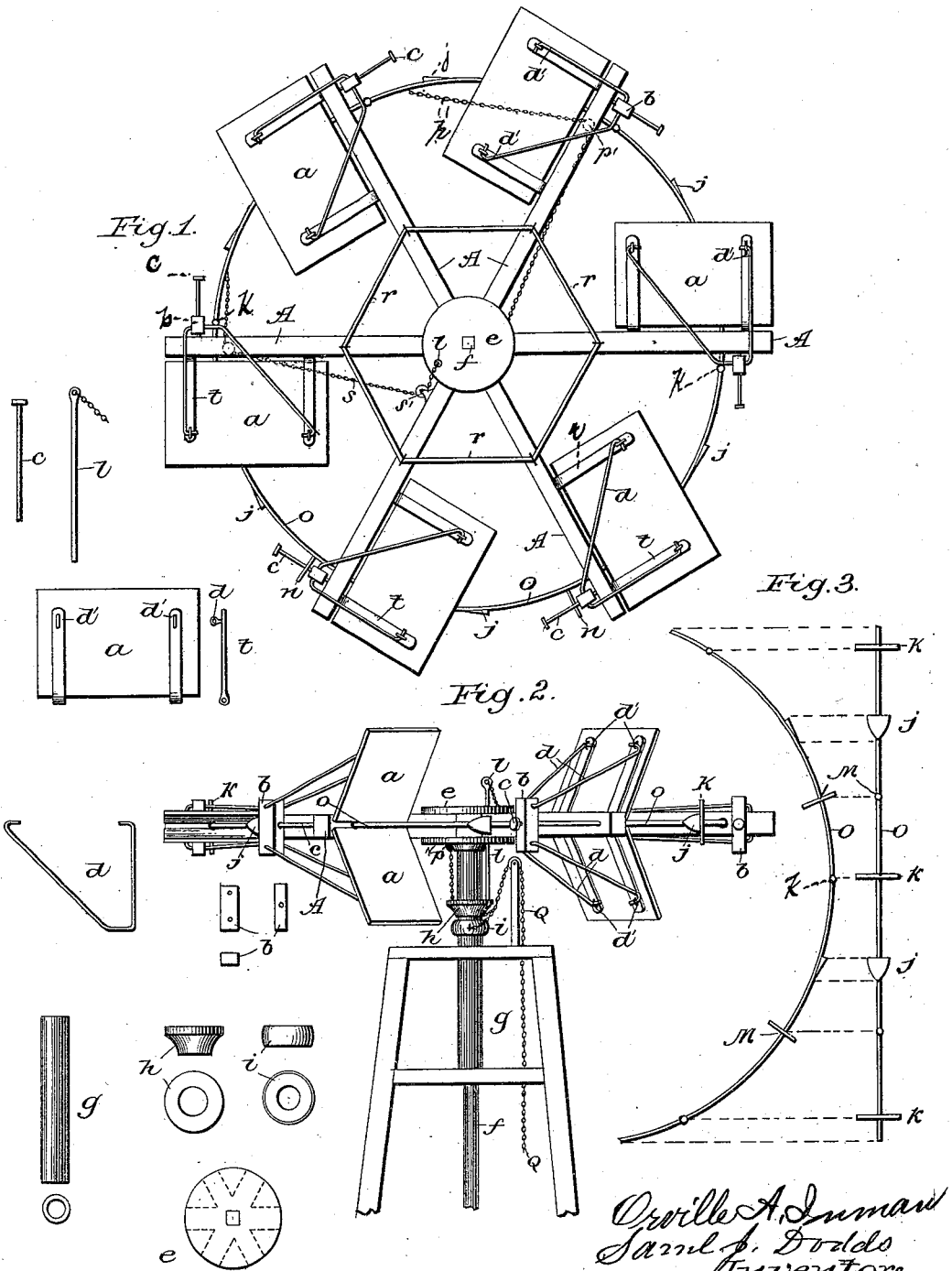

SAMUEL J. DODDS AND ORVILLE A. INMAN, OF WEST POINT, STEPHENSON COUNTY, ILLINOIS.

WINDMILL.

SPECIFICATION forming part of Letters Patent No. 354,972, dated December 28, 1886.

Application filed January 18, 1886. Serial No. 188,886. (No model.)

*To all whom it may concern:*

Be it known that we, SAMUEL J. DODDS and ORVILLE A. INMAN, both residents of the township of West Point, in the county of Stephenson and State of Illinois, have invented certain new and useful Improvements in Wind Power or Windmills, which improvement is fully set forth in the following specification, reference being had to the accompanying drawings and the letters of reference marked thereon.

The object of our invention is to apply the force of the wind to motive power by the use of a horizontal wheel supplied with wings, which are caused to open and close automatically by the action of the wind upon the front or back of the wings.

In the drawings, Figure 1 is a top view or elevation of the wheel. The wheel being thrown out of gear, the wings $a$ are closed. Fig. 2 is a side elevation, two wings being open and showing the front of one wing and the back of the other, and two wings are shown closed, in one of which the wing is concealed by the arm A. Fig. 3 is a top view of part of the sliding track O detached from the wheel, showing the position of the pins K K and M M, and wedge-shaped attachment $j$.

Similar letters refer to similar parts in the several views.

The frame of the wheel in its several parts should be firmly and strongly constructed, so as to resist the force of the wind as well as the vibrations of the operating parts.

The hub $e$, Fig. 1, fits firmly upon the operating-shaft $f$, the orifice in the hub $e$ being square, and that portion of the operating-shaft $f$ which passes through the hub being squared to fit the orifice in the hub. The operating-shaft extends downward through the tube $g$ to the frame-work of the tower, and thence down as far as may be desired.

In the hub $e$ an indefinite number of arms, A A, are firmly inserted and securely bolted to the hub. The hub $e$ may be of cast-iron or any suitable material of sufficient strength. The arms A A are preferably made of wood, from two to four inches square, and of any desirable length, according to the power desired to be obtained from the wheel, the length varying from four to ten feet. These arms, after being fastened to the hub, are further strengthened by braces $r\ r\ r\ r$, Fig. 1, extending from arm to arm, and bolted or otherwise firmly secured in place.

To each of the arms A, near the outer end, two wings, $a\ a$, are attached by suitable hinges or their equivalents, in sufficient number to render them secure, and in such manner as to allow the wings to open and close freely by the action of the wind. These wings may be constructed of any suitable material, as wood, canvas, or sheet-iron; we, however, preferably use sheet-iron. The wings may be varied in length, width, and shape, according to the power desired. The two wings on each arm are placed one above the other, only one on each arm being shown in Fig. 1, but both are shown in Fig. 2. The wings may be strengthened by bars of wood or iron $t\ t$, passing transversely across the back of the wings and firmly riveted or bolted thereto. Through an orifice made horizontally through each of the arms a movable truck or rim, $o$, (a section of which is fully shown in Fig. 3) passes. This track O is made in sections and riveted or bolted together. The orifices in the arms are made sufficiently large to allow the track or rim O to move freely back and forth in throwing the wheel in or out of gear. Through this movable track iron pins K K K, &c., are placed perpendicularly, which serve as stops by being brought into contact with the rods extending inwardly from the blocks or slides $b$, hereinafter described, thus preventing the track passing forward beyond this point, and at the same time holding the blocks $b$ firmly against the arms A when the wheel is thrown out of gear, thus preventing the wings from opening. The pins M M, &c., pass through the movable track horizontally and operate as stops by being brought into contact with the arms A, thus preventing the track from moving backward beyond this point.

The movable track is provided with a number of wedge-shaped attachments, $j$, both above and below the track, and securely fastened to it. These attachments correspond in number to the number of arms, and operate when the wheel is thrown in gear to separate the front or outer edges of the upper and lower wings with which they severally come in contact in such manner as to allow the force of the wind to operate upon the surface of the wings.

To the movable track O, at $j$, a small chain, $s$, is fastened. From this place the chain $s$ passes to and over a pulley at $s'$ on arm A. From thence it passes to the top of rod $l$, to which the end is fastened. The rod $l$ passes downward through an opening in the hub $e$, and is firmly fastened to the collar $h$, as shown in Fig. 2. To the movable track O, at $j$, the end of the chain P is fastened. From $j$ the chain P passes to and over a pulley in the arm A at $P'$. From thence the chain passes along the arm to a pulley, $P^2$, on the under side of the hub $e$, and from thence down to the collar or sleeve $h$, to which the end of chain is attached. Near the outer end of each of the arms a square iron bar, $c$, is passed horizontally and firmly bolted and stayed. The length of the bar $c$ is in proportion to the breadth of the wings, and extends back from the arm, as shown in Fig. 1.

Each of the bars $c$ is provided with a slide-block, $b$, which moves freely back and forth on the bar $c$. The slide-blocks $b$ are perforated horizontally with holes for the reception of the rods $d$ $d$, &c., and pins $n$ $n$.

From the slide-blocks $b$ two rods, $d$ $d$, pass upward and forward to the back surface of the upper wings, where they are hinged to the wings, as shown at $d'$ $d'$. From the slide-blocks two similar bars or rods extend forward and downward to the under surface of the lower wings, to which they are hinged; or these rods may be attached to the movable track $o$, and extend outwardly to the slides $b$, as shown at $n$, Fig. 1. In the latter case the pins K K in the movable track may be dispensed with.

G, Fig. 2, is an iron tube securely clamped and firmly bolted to the tower or other device upon which the wheel is erected and forms one of the supports of the wheel, and upon which in a measure the hub rests. Through this tube the propelling or operating shaft $f$ passes. On this tube are two iron collars or sleeves, $h$ and $i$. The collar $h$ moves freely up and down on the tube, and also revolves on the tube with the revolutions of the wheel when in motion. The collar $i$ does not revolve with but moves freely up and down on the tube. To the collar $i$ a chain, Q, Fig. 2, is attached by two short chains which fasten to the collar on opposite sides. These short chains unite and form the chain Q, which passes up and over a pulley on top of upright post, and thence down to the ground.

*Operation.*—The operation of our invention is as follows: When the wheel is in gear, the wind blowing from any direction will strike upon the front edge of two or more pairs of wings, causing them to separate, and thus exposing the whole surface of both wings to the action of the wind, and the force of the wind will cause the wheel to revolve, bringing other wings into position. At the same time the rods $d$ $d$ will force the sliding blocks $b$ backward along the bar $c$ until the rods $n$ $n$ are brought into contact with the pins K K in movable track O. These act as a stop, and will prevent the wings opening too far. As the wind acts upon the wings in position, its force will cause the wheel to revolve until the wings first acted upon are carried to the opposite side of the wheel, when the wind blowing against the back of the wings will close them. As each pair of wings are brought into position by the revolution of the wheel the wind strikes upon the front edge, and the wings will be opened in succession, and in like manner successively carried to the opposite side, when the wind will close them. To throw the wheel out of gear, the chain Q is pulled downward. This raises the collar $i$ into juxtaposition with the collar $h$, and the chain being pulled farther down the collar $i$ raises the collar $h$ upward on the tube $g$ to the hub of the wheel. At the same time the upper end of the rod $l$ is raised above the hub $e$, and the chain $s$ draws the movable track O forward until the pins K K, pressing upon the rods $n$ $n$, move the slide-blocks $b$ against the back of the arms A. At the same time the rods $d$ $d$ force the wings together and hold them firmly in that position, when the chain Q is securely stayed near the ground. To throw the wheel in gear, the chain Q is unfastened, whereupon the weight of the collar $i$ will carry it down the tube $g$. The collar $h$ then being released, will by its own weight pass down the tube. This will draw upon the chain P, which, being fastened to the movable track O, will move the track backward until the pins M M are brought into contact with the front of the arms A. As the movable track moves backward the wedge-shaped attachments $j$ enter between the edges of the upper and lower wings in such manner as to open them slightly, so that the wind may act upon the front surface of the respective wings as they are brought into position by the revolution of the wheel.

Having thus fully described our invention, what we claim as our invention, and desire to secure by Letters Patent, is—

1. In a horizontal windmill, the combination, with a vertical-operating shaft, $f$, hub $e$, arms A, and braces $r$, of two wings, $a$ $a$, hinged to each arm, each having strengthening-bars $t$ $t$, bar $c$, sliding blocks $b$, rods $d$ $d$, rods $n$, and movable track O, substantially as described, and so arranged that the wings will automatically open or close as the wind comes into contact with the front or rear surface of the wings with each revolution of the wheel.

2. In windmills, the combination of a horizontal wheel, substantially as described, with the movable track O, provided with wings $a$, hinged to fixed arms A, bar $c$, sliding blocks $b$, bars $d$, perpendicular pins K, and horizontal pins M, arranged substantially as described, and operating as a stop to prevent the wings, whenever the front surface of the same is brought into contact with the wind, from opening too far.

3. In windmills, the combination, with a horizontal wheel and movable track, substantially as described, of the chain $s$, pulley $s'$, rod $l$, movable collars $h$ and $i$, hollow shaft $g$, chain Q, and post and pulley $q'$, arranged substantially as described, by means of which the wings may be partially closed, thus regulating the power of the wheel, or the wings may be entirely closed and firmly retained in either position so long as desired.

4. In windmills, the combination of a horizontal wheel and movable track, O, provided with wedge attachments, substantially as described, of the chain P, pulleys $P'$ and $P^2$, movable collars $h$ and $i$, hollow shaft $g$, and vertically-operating shaft $f$, substantially as arranged and described, by which the wheel may be thrown into gear and the front edges of the wings slightly opened, so that the wind may act upon the front surface of the wings as each pair is respectively brought into position by the revolution of the wheel.

5. The combination, in a horizontal windmill, of a perpendicular operating-shaft, $f$, hub $e$, and radial arms A, automatical folding wings $a\ a$, hinged to radial arms A, bars $c$, sliding blocks $b$, horizontal pins M, movable track O, wedge-shaped attachments $j$, chains $s$ and P, pulleys $s'$, $P'$, and $P^2$, rod $l$, movable collars $h$ and $i$, hollow shaft $g$, chain Q, and post and pulley $q'$, substantially as described, the whole forming a wind power that may easily be controlled by partially closing the folding wings, or the wings wholly closed when not in use, and as a protection against storms.

SAML. J. DODDS.
ORVILLE A. INMAN.

In presence of—
W. H. H. MILLER,
H. M. DODDS.